(12) United States Patent
Li et al.

(10) Patent No.: US 12,543,052 B2
(45) Date of Patent: Feb. 3, 2026

(54) METHOD AND DEVICE FOR MEASUREMENT RELAXATION

(71) Applicant: GUANGDONG OPPO MOBILE TELECOMMUNICATIONS CORP., LTD., Dongguan (CN)

(72) Inventors: Haitao Li, Dongguan (CN); Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 468 days.

(21) Appl. No.: 17/864,711

(22) Filed: Jul. 14, 2022

(65) Prior Publication Data

US 2022/0353763 A1 Nov. 3, 2022

Related U.S. Application Data

(63) Continuation of application No. PCT/CN2020/072131, filed on Jan. 15, 2020.

(51) Int. Cl.
*H04W 24/02* (2009.01)
*H04W 24/08* (2009.01)
*H04W 36/00* (2009.01)
*H04W 36/32* (2009.01)

(52) U.S. Cl.
CPC ........... *H04W 24/02* (2013.01); *H04W 24/08* (2013.01); *H04W 36/0058* (2018.08); *H04W 36/0088* (2013.01); *H04W 36/322* (2023.05)

(58) Field of Classification Search
CPC .............................. H04W 24/08; H04W 24/02
See application file for complete search history.

(56) References Cited

U.S. PATENT DOCUMENTS

| 11,665,567 | B2 * | 5/2023 | Wang | H04B 7/0695 370/242 |
| 2017/0019810 | A1 | 1/2017 | Wu et al. | |
| 2019/0320490 | A1 | 10/2019 | Liu et al. | |
| 2021/0105643 | A1 * | 4/2021 | Kim | H04W 48/16 |
| 2022/0248244 | A1 * | 8/2022 | Chen | H04B 7/0695 |

(Continued)

FOREIGN PATENT DOCUMENTS

| CN | 107295558 A | 10/2017 |
| CN | 107426764 A | 12/2017 |
| EP | 2779745 A1 | 9/2014 |

(Continued)

OTHER PUBLICATIONS

Extended European Search Report issued in European application No. 20914664.6, mailed on Dec. 7, 2022.

(Continued)

*Primary Examiner* — Kevin C. Harper
(74) *Attorney, Agent, or Firm* — BAYES PLC

(57) ABSTRACT

A method and device for measurement relaxation are provided. The method comprises: indicating the measuring state of a terminal device, wherein the measuring state comprises normal measurement and measurement relaxation. Therefore, indicating the measuring state of a terminal device and indicating that the measuring state of the terminal device is normal measurement or measurement relaxation realize the measurement relaxation of a serving cell.

20 Claims, 6 Drawing Sheets

210

Determining a measurement state of a terminal device according to an indication of a network device

(56) References Cited

U.S. PATENT DOCUMENTS

2022/0322193 A1* 10/2022 Tao ................... H04W 36/0061
2022/0369137 A1* 11/2022 Reial ..................... H04W 24/08

FOREIGN PATENT DOCUMENTS

WO          2015149337 A1    10/2015
WO      WO-2021078235 A1 *   4/2021   ........... H04B 7/0695

OTHER PUBLICATIONS

Vivo, "RRM measurement relaxation criteria", 3GPP TSG-RAN WG2 Meeting #107bis, R2-1912334, Chongqing, China, Oct. 14-18, 2019.
Vivo, "UE Power Consumption Reduction in RRM Measurement", 3GPP TSG-RAN WG2 Meeting #107bis, R2-1912335, Chongqing, China, Oct. 14-18, 2019.
Intel Corporation, "Relaxation of RRM measurements", 3GPP TSG RAN WG2 Meeting #107bis, R2-1912789, Chongqing, China, Oct. 14-18, 2019.
International Search Report in the International Application No. PCT/CN2020/072131, mailed on Sep. 30, 2020.
Written Opinion of the International Searching Authority in the International Application No. PCT/CN2020/072131, mailed on Sep. 30, 2020.
First Office Action of the European application No. 20914664.6, issued on Apr. 30, 2025, 9 pages.

\* cited by examiner

Determining a measurement state of a terminal device according to an indication of a network device — 210

METHOD AND DEVICE FOR MEASUREMENT RELAXATION

CROSS-REFERENCE TO RELATED APPLICATION

This application is a continuation of International Application No. PCT/CN2020/072131, filed on Jan. 15, 2020, entitled "Method and Device for Measurement Relaxation", the content of which is incorporated herein by reference in its entirety.

BACKGROUND

In the related art for relaxing a measurement, when reference signal received power (RSRP) of a serving cell changes little, it means that the terminal device has a small demand for cell reselection. Therefore, the measurement of a neighboring cell can be relaxed to achieve the purpose of energy saving of the terminal device.

The related art only involves relaxing the measurement of the neighboring cell. Since a criterion for relaxing the measurement of the neighboring cell depends on the measurement result of the serving cell, it is not determined whether the measurement of the serving cell can be relaxed. However, in some scenarios, the terminal device is stationary, thus the possibility of cell reselection is very small, and the measurement of the serving cell is not necessarily performed. In this case, there is a technical problem that relaxing the measurement of the serving cell cannot be realized.

SUMMARY

The present application relates to the field of communication technology, more particularly, to a method and device for relaxing a measurement. The present disclosure provides a method and device for relaxing a measurement to solve the technical problem that relaxing the measurement of the serving cell cannot be realized.

According to a first aspect, in an embodiment of the present disclosure, there is provided a method for relaxing a measurement, applied to a network device. The method includes the following operation.

A measurement state of a terminal device is indicated, the measurement state including a normal measurement and a relaxed measurement.

According to a second aspect, in an embodiment of the present disclosure, there is provided a method for relaxing a measurement, applied to a terminal device. The method includes the following operation.

A measurement state of the terminal device is determined according to an indication of a network device, the measurement state including a normal measurement and a relaxed measurement.

According to a third aspect, in an embodiment of the present disclosure, there is provided a device for relaxing a measurement. The device includes an indicating module.

The indicating module is configured to indicate a measurement state of a terminal device, the measurement state including a normal measurement and a relaxed measurement.

According to a fourth aspect, in an embodiment of the present disclosure, there is provided a device for relaxing a measurement. The device includes a determining module.

The determining module is configured to determine a measurement state of a terminal device according to an indication of a network device, the measurement state including a normal measurement and a relaxed measurement.

According to a fifth aspect, in an embodiment of the present disclosure, there is provided a terminal device, including a processor and a memory. Herein the memory is configured to store a program executable by the processor, and the processor is configured to execute the program to implement any of the above methods for relaxing the measurement.

According to a sixth aspect, in an embodiment of the present disclosure, there is provided a computer-readable storage medium, having stored thereon a computer program. Herein the computer program, when being executed, implements any of the above methods for relaxing the measurement.

According to a seventh aspect, in an embodiment of the present disclosure, there is provided a computer program product, and the computer program product is stored on a non-transitory computer-readable storage medium. Herein the computer program, when being executed, implements any of the above methods for relaxing the measurement.

According to an eighth aspect, in an embodiment of the present disclosure, there is provided a chip, which includes a processor configured to call and execute a computer program in a memory to cause a device equipped with the chip to implement any of the above methods for relaxing the measurement.

According to a ninth aspect, in an embodiment of the present disclosure, there is provided a computer program that, when being executed, implements any of the above methods for relaxing the measurement.

It should be understood that the above general description and the following detailed description are merely exemplary and are not intended to limit the present disclosure.

BRIEF DESCRIPTION OF THE DRAWINGS

The accompanying drawings, incorporated into the description and forming part of this description, illustrate specific embodiments in accordance with this application and are used together with the description to explain the principles of this disclosure.

DETAILED DESCRIPTION

Figure 1:
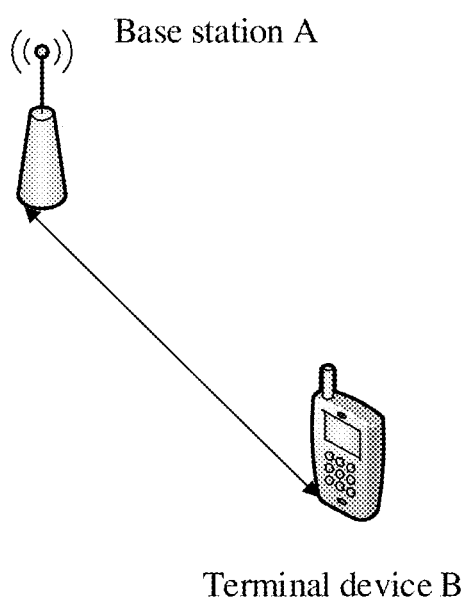
FIG. 1 is a network architecture diagram of a communication system to which embodiments of the present disclosure may be applied.

Exemplary embodiments will be described in detail herein, examples of which are indicated in the drawings. When the following description relates to the drawings, the same numerals in the different drawings denote the same or similar elements, unless otherwise indicated. The embodiments described in the following exemplary embodiments do not represent all embodiments consistent with the embodiments of the present disclosure. Rather, they are only examples of methods and devices consistent with some aspects of the present disclosure as detailed in the appended claims. Based on the specific embodiments of the present disclosure, all other specific embodiments obtained by a person skilled in the art without creative efforts shall fall within the protection scope of the present disclosure.

FIG. 1 illustrates a system architecture of a communication system to which the following embodiments of the present disclosure may be applied. The system architecture includes a base station A and a terminal device B.

In the related art, a neighboring cell measurement behavior of the terminal device B in an idle state and an inactive state is constrained by related parameters in system broadcast messages. For example:

for the start of intra-frequency measurement, when a received power in cell search (Srxlev) of the serving cell>an intra-frequency measurement start threshold (SintraSearchP) and a received signal quality in cell search (Squal) of the serving cell>an intra-frequency RSRQ measurement start threshold (SIntraSearchQ), the intra-frequency neighboring cell measurement is not started, otherwise, the intra-frequency neighboring cell measurement is started;

for the inter-frequency measurement with the same priority or low priority, when an Srxlev of the serving cell>an inter-frequency measurement start threshold (SnonIntraSearchP) and an Squal of the serving cell>an inter-frequency RSRQ measurement start threshold (SnonIntraSearchQ), the inter-frequency measurement with the same priority or low priority is not started, otherwise, the inter-frequency measurement is started;

for the inter-frequency measurement with the high priority, the measurement is always started.

In addition to the system message signaling, the frequency priority configuration may be carried by means of a radio resource control (RRC) release message. In this case, the base station A configures a dedicated frequency priority for the terminal device B, and after receiving the dedicated frequency priority, the terminal device B covers common frequency priority information broadcast by the system message.

For the terminal devices with low mobility narrow band internet of things (NB-IoT) and enhancedmachine-typecommunication (eMTC), when the RSRP of the serving cell changes little, it means that there is little need for the terminal device to perform cell reselection. Therefore, the neighboring cell measurement can be relaxed to achieve the purpose of energy saving of the terminal device B.

Specifically, configuring the threshold Rx level value selected by the blocking unit (SSearchDeltaP) in the system message means that the cell supports the terminal device B to relax the neighboring cell measurement. If and only if the condition is satisfied, the terminal device B can relax the neighboring cell measurement:

1. satisfying a condition for relaxing the neighboring cell measurement within a time range of TSearchDeltaP;
2. less than 24 hours since the last measurement.

Condition for relaxing the measurement: (SrxlevRef−Srxlev)<SSearchDeltaP.

The Srxlev is the current Srxlev measurement value of the serving cell and the SrxlevRef is the reference Srxlev value of the serving cell.

When the terminal device B selects or reselects a new cell, or if (Srxlev−SrxlevRef)>0, or if the condition for relaxing the measurement is not satisfied within the time range of TSearchDeltaP:

the terminal device B sets SrxlevRef as the current Srxlev measurement value of the serving cell;

the value of TSearchDeltaP is five minutes, or if extended discontinuous receive (eDRX) cycle is configured and the eDRX cycle is longer than five minutes, the value of TSearchDeltaP is the length of eDRX cycle.

The 5th generation mobile networks (5G) system introduces an energy saving technique, and two criteria are defined for the radio resource management (RRM) measurement of the terminal device B, which are not-cell-edge criterion and the low-mobility criterion respectively. The not-cell-edge criterion mainly defines an RSRP threshold. When the RSRP measurement value of the serving cell is greater than the threshold, the UE may relax the neighboring cell RRM measurement. The low-mobility criterion, by defining a time scale and a delta-RSRP threshold, uses a process similar to that of NB-IoT to determine the relaxation of the measurement of the neighboring cell at the low mobility.

The related art only involves relaxing the measurement of the neighboring cell. Since a criterion for relaxing the measurement of the neighboring cell depends on the measurement result of the serving cell, it is not determined whether the measurement of the serving cell can be relaxed. However, in some scenarios, the terminal device is stationary, thus the possibility of cell reselection is very small, and the measurement of the serving cell is not necessarily performed. In this case, there is a technical problem that relaxing the measurement of the serving cell cannot be realized.

The following specific embodiments of the present disclosure will describe in detail how to realize relaxing the measurement of the serving cell, thereby solving the technical problem that relaxing the measurement of the serving cell cannot be realized.

In the present system architecture, the example communication system may be a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced long term evolution (LTE-A) system, a new radio (NR) system, an evolution system of NR system, an LTE-based access to unlicensed spectrum (LTE-U) system, an NR based access to unlicensed spectrum (NR-U) system, a universal mobile telecommunication system (UMTS), and a worldwide interoperability for microwave access (WiMAX) communication systems, a wireless local area network (WLAN), wireless fidelity (WiFi), narrow band internet of things (NB-IoT) and enhancedmachine-typecommunication (eMTC), next-generation communication systems, or other communication systems.

User terminals to which embodiments of the present disclosure relate may include various handheld devices, in-vehicle devices, wearable devices, computing devices, or other processing devices connected to wireless modems with wireless communication functions, as well as various forms of user equipment (UE), mobile stations (MSs), terminal devices, and the like. For ease of description, the above-mentioned devices are collectively referred to as terminal devices.

In addition, the terms "system" and "network" are often used interchangeably herein. In this context, the term "and/or" is merely an association relationship describing an association object, and indicates that three relationships may exist, for example, A and/or B may indicate that there is only A, there are both A and B, and there is only B. In addition, the character "/" herein generally represents that the relationship between the associated objects is "or".

It should be understood that, in a specific embodiment of the present disclosure, "B corresponding to A" indicates that B is associated with A, and B may be determined from A. It should be understood, however, that determining B from A does not mean determining B only from A, but may also be determining B from A and/or other information.

Figure 2:
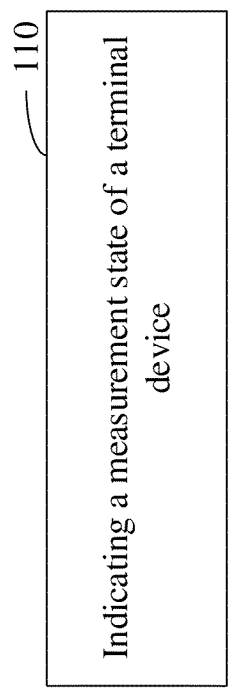
FIG. 2 is a flowchart of a method for relaxing a measurement according to a first embodiment of the present disclosure.

FIG. 2 is a flowchart of a method for relaxing a measurement according to a first embodiment of the present disclosure. As illustrated in FIG. 2, the method for relaxing the measurement may include the following operation.

At operation 110, a measurement state of a terminal device is indicated.

The measurement state includes a normal measurement and a relaxed measurement. The terminal device performs cell measurement according to the measurement state, and indicates the terminal device to perform normal measurement or relax the measurement by indicating the measurement state of the terminal device.

Optionally, the measurement state includes a measurement state of a serving cell.

Optionally, the operation 110 may include the following operation.

At operation 111, the measurement state of the terminal device is indicated through a system information broadcast (SIB).

Optionally, the operation 111 may include the following operation.

It is indicated that the measurement state of the terminal device is relaxed measurement through the SIB.

The terminal device includes at least one of:
a terminal device with a specified type;
a terminal device with a positioning capability and in a stationary state;
a terminal device of which no cell reselection has occurred within a time threshold; or
a terminal device whose reference signal received power is greater than a threshold.

The network device indicates the measurement state of the terminal device through the SIB. The network device may indicate that the measurement state of the specific terminal device in the cell is the relaxed measurement, and further indicate that the terminal device relaxes the measurement. The specific terminal device includes at least one of: a terminal device with a specified type, such as a video surveillance device, an industrial sensor device, and the like; a terminal device with a positioning capability and in a stationary state; a terminal device of which no cell reselection has occurred within a time threshold, the time threshold being set in advance; or a terminal device whose reference signal received power is greater than a threshold, the threshold being set in advance. The terminal device may be a terminal device in an idle state, a connected state, or an inactive state.

The beneficial effects of the operation 111 are as follows: for the scenario of the stationary network and the stationary terminal device, the network device can enable the terminal device to stop/relax the measurement of the serving cell within a period of time to save power consumption. When the network environment changes (for example, before the serving cell is about to close), the network device indicates the terminal device to perform the serving cell measurement, and the terminal device can start the neighboring cell measurement as soon as possible and complete the cell reselection.

Optionally, the operation 110 may include the following operation.

At operation 113, the measurement state of the terminal device is indicated through dedicated signaling.

The terminal device includes a terminal device in a connected state.

Optionally, the method for relaxing the measurement may include the following operation.

At operation 130, the dedicated signaling is generated according to measurement assistance information reported by the terminal device.

Optionally, the operation 113 may include the following operation.

It is indicated that the measurement state of the terminal device is the relaxed measurement through the dedicated signaling in response to at least one of that: the measurement assistance information includes that the terminal device is of a specified type, or the measurement assistance information includes that the terminal device is in a stationary state or a low mobility state; and it is indicated that the measurement state of the terminal device is the normal measurement through the dedicated signaling in response to that the measurement assistance information includes that the terminal device leaves the stationary state or the low mobility state.

Optionally, the terminal device is in the stationary state or the low mobility state includes at least one of that: the terminal device with a positioning capability determines that the terminal device is in the stationary state, no cell reselection has occurred within a time threshold, or a number of cell reselections within the time threshold is less than a threshold; and the terminal device leaves the stationary state or the low mobility state includes at least one of that: the terminal device with the positioning capability determines that the terminal device leaves the stationary state or the low mobility state, or the number of cell reselections within the time threshold is greater than the threshold.

Optionally, the dedicated signaling includes at least one of:
radio resource control (RRC) signaling;
media access control control element (MAC CE) signaling; or
physical downlink control channel (PDCCH) signaling.

The network device indicates the measurement state of the terminal device through dedicated signaling, and the terminal device may be a terminal device in a connected state. The network device may generate the dedicated signaling according to the measurement assistance information reported by the terminal device. When the measurement assistance information includes that the terminal device is of a specified type, such as an industrial sensor or a video monitoring device, and/or when the measurement assistance information includes that the terminal device is in a stationary state or a low mobility state, for example, the terminal device with a positioning capability determines that it is in a stationary state, and/or no cell reselection has occurred within a time threshold, it is indicated that the measurement state of the terminal device is the relaxed measurement through dedicated signaling.

When the measurement assistance information includes that the terminal device leaves the stationary state or the low mobility state, for example, the terminal device with the positioning capability determines that it leaves the stationary state or the low mobility state, and/or that the number of times of cell reselection within the time threshold is greater than the times threshold, it is indicated that the measurement state of the terminal device is the normal measurement through the dedicated signaling.

The dedicated signaling includes at least one of: RRC signaling, such as measurement configuration in an extended RRC reconfiguration message; or MAC CE signaling, such as activation/deactivation instructions of the serving cell measurement; or PDCCH signaling, such as activation/deactivation instructions of the serving cell measurement.

The beneficial effects of operation 113 are that the network device learns the stationary state of the terminal device through the measurement assistance information, and further indicates the terminal device to stop the serving cell measurement under the stationary network environment, so that the terminal device can save power. The dedicated signaling can achieve control of each terminal device, facilitating more flexible control of the network.

Optionally, the operation 110 may include the following operation.

At operation 115, at least one of a first timer or a second timer is configured for the terminal device.

The first timer is a maximum duration for the relaxed measurement, and the second timer is a duration for the normal measurement.

Optionally, the second timer is configured to switch the measurement state of the terminal device to the relaxed measurement in response to that the measurement state of the terminal device is the normal measurement and the second timer expires; and the first timer is configured to switch the measurement state of the terminal device to the normal measurement in response to that the measurement state of the terminal device is the relaxed measurement and the first timer expires.

The network device configures a first timer and/or a second timer for the terminal device, the first timer is a maximum duration for the relaxed measurement, and the second timer is a duration for the normal measurement. When the measurement state of the terminal device is the normal measurement and the second timer expires, or an indication that the measurement state is the relaxed measurement is received, the measurement state of the terminal device is switched to the relaxed measurement, that is, the terminal device relaxes the measurement. When the measurement state of the terminal device is the relaxed measurement and the first timer expires, or an indication that the measurement state is the normal measurement is received, the measurement state of the terminal device is switched to the normal measurement, that is, the terminal device performs normal measurement.

Optionally, the operation of relaxing the measurement includes at least one of that:
the measurement is performed at a first time interval; or
the measurement is stopped.

The first time interval is a time interval at which the measurement is performed when the measurement is relaxed, which is preconfigured.

In the first embodiment, a measurement state of the terminal device is indicated, the measurement state including a normal measurement and a relaxed measurement. Therefore, through indicating the measurement state of the terminal device, it is indicated that the measurement state of the terminal device is the normal measurement and the relaxed measurement, relaxing the measurement of the serving cell is realized, and the technical problem that relaxing the measurement of the serving cell cannot be realized is solved.

Figure 3:
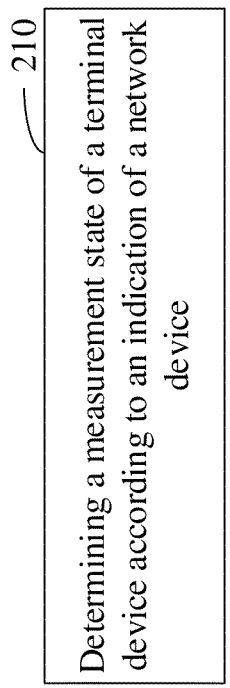
FIG. 3 is a flowchart of a method for relaxing a measurement according to a second embodiment of the present disclosure.

FIG. 3 is a flowchart of a method for relaxing a measurement according to a second embodiment of the present disclosure. As illustrated in FIG. 3, the method for relaxing the measurement may include the following operation.

At operation 210, a measurement state of the terminal device is determined according to an indication of a network device.

The measurement state includes a normal measurement and a relaxed measurement.

Optionally, the measurement state includes a measurement state of a serving cell.

Optionally, the operation 210 may include the following operation.

At operation 211, the measurement state of the terminal device is determined according to an indication of a system information broadcast (SIB).

Optionally, the operation 211 may include the following operation.

It is determined that the measurement state of the terminal device is relaxed measurement according to the indication of the SIB.

The terminal device includes at least one of:
a terminal device with a specified type;
a terminal device with a positioning capability and in a stationary state;
a terminal device of which no cell reselection has occurred within a time threshold; or
a terminal device whose reference signal received power is greater than a threshold.

Optionally, the operation 210 may include the following operation.

At operation 213, the measurement state of the terminal device is determined according to an indication of dedicated signaling.

The terminal device includes a terminal device in a connected state.

Optionally, the method for relaxing the measurement may include the following operation.

Measurement assistance information is reported to the network device, the measurement assistance information being used by the network device to generate the dedicated signaling according to the measurement assistance information.

Optionally, the operation 213 may include the following operations.

It is determined that the measurement state of the terminal device is the relaxed measurement according to the indication of the dedicated signaling in response to at least one of that: the measurement assistance information includes that the terminal device is of a specified type, or the measurement assistance information includes that the terminal device is in a stationary state or a low mobility state; and it is determined that the measurement state of the terminal device is the normal measurement according to the indication of the dedicated signaling in response to that the measurement assistance information includes that the terminal device leaves the stationary state or the low mobility state.

Optionally, the terminal device being in the stationary state or low mobility state includes at least one that: the terminal device with the positioning capability determines that the terminal device is in the stationary state, no cell reselection has occurred within a time threshold, or a number of cell reselections within the time threshold is less than a threshold; and the terminal device leaving the stationary state or low mobility state includes at least one of that: the terminal device with the positioning capability determines that the terminal device leaves the stationary state or the low mobility state, or the number of cell reselections within the time threshold is greater than the threshold.

Optionally, the dedicated signaling includes at least one of:

radio resource control (RRC) signaling;
media access control control element (MAC CE) signaling; or
physical downlink control channel (PDCCH) signaling.

Optionally, the operation 210 may include the following operation.

At operation 215, at least one of a first timer or a second timer for the network device is received. The first timer is a maximum duration for the relaxed measurement, and the second timer is a duration for the normal measurement.

Optionally, the method for relaxing the measurement may include the following operations.

The measurement state of the terminal device is switched to the relaxed measurement in response to that the measurement state of the terminal device is the normal measurement and the second timer expires; and the measurement state of the terminal device is switched to the normal measurement in response to that the measurement state of the terminal device is the relaxed measurement and the first timer expires.

Optionally, the operation of relaxing the measurement includes at least one of that:

the measurement is performed at a first time interval; or
the measurement is stopped.

The implementation process of the method for relaxing the measurement is described in detail in the implementation process of the corresponding operation in any one of the methods for relaxing the measurement provided in the first embodiment.

Figure 4:
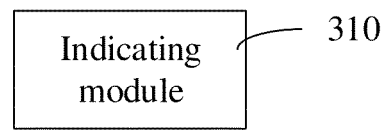
FIG. 4 is a block diagram of a device for relaxing a measurement according to a third embodiment of the present disclosure.

FIG. 4 is a block diagram of a device for relaxing a measurement according to a third embodiment of the present disclosure. As illustrated in FIG. 4, the device is a network device, and may include but is not limited to an indicating module 310.

The indicating module 310 is configured to indicate a measurement state of a terminal device, the measurement state including a normal measurement and a relaxed measurement. Optionally, the connection information includes discovery information and/or response information.

Optionally, the measurement state includes a measurement state of a serving cell.

Optionally, the indicating module 310 is further configured to:

indicate the measurement state of the terminal device through a system information broadcast (SIB).

Optionally, the indicating module 310 is configured to indicate the measurement state of the terminal device through the SIB, and is further configured to:

indicate, through the SIB, that the measurement state of the terminal device is the relaxed measurement.

The terminal device includes at least one of:

a terminal device with a specified type;
a terminal device with a positioning capability and in a stationary state;
a terminal device of which no cell reselection has occurred within a time threshold; or
a terminal device whose reference signal received power is greater than a threshold.

Optionally, the indicating module 310 is further configured to:

indicate the measurement state of the terminal device through dedicated signaling.

The terminal device includes a terminal device in a connected state.

Optionally, the device for relaxing the measurement may include, but is not limited to a generating module.

The generating module is configured to generate the dedicated signaling according to the measurement assistance information reported by the terminal device.

Optionally, the indicating module 310 is configured to indicate the measurement state of the terminal device through the dedicated signaling according to the measurement assistance information reported by the terminal device, and is further configured to:

indicate, through the dedicated signaling, that the measurement state of the terminal device is the relaxed measurement in response to at least one of that: the measurement assistance information includes that the terminal device is of a specified type, or the measurement assistance information includes that the terminal device is in a stationary state or a low mobility state; and indicate, through the dedicated signaling, that the measurement state of the terminal device is the normal measurement in response to that the measurement assistance information includes that the terminal device leaves the stationary state or the low mobility state.

Optionally, the terminal device being in the stationary state or the low mobility state includes at least one of that: the terminal device with a positioning capability determines that the terminal device is in the stationary state, no cell reselection has occurred within a time threshold, or a number of cell reselections within the time threshold is less than a threshold; and the terminal device leaving the stationary state or the low mobility state includes at least one of that: the terminal device with the positioning capability determines that the terminal device leaves the stationary state or the low mobility state, or the number of cell reselections within the time threshold is greater than the threshold.

Optionally, the dedicated signaling includes at least one of:

radio resource control (RRC) signaling;
media access control control element (MAC CE) signaling; or
physical downlink control channel (PDCCH) signaling.

Optionally, the device for relaxing the measurement may include, but is not limited to a configuring module 330.

The configuring module 330 is configured to configure at least one of a first timer or a second timer for the terminal device. The first timer is a maximum duration for the relaxed measurement, and the second timer is a duration for the normal measurement.

Optionally, the second timer is configured to switch the measurement state of the terminal device to the relaxed measurement in response to that the measurement state of the terminal device is the normal measurement and the second timer expires; and the first timer is configured to switch the measurement state of the terminal device to the normal measurement in response to that the measurement state of the terminal device is the relaxed measurement and the first timer expires.

Optionally, the operation of relaxing the measurement includes at least one of that:

the measurement is performed at a first time interval; or the measurement is stopped.

The implementation process of the functions and effects of each module and other parts not described or defined in detail in the embodiment are described in detail in the first embodiment, and are not described herein.

Figure 5:
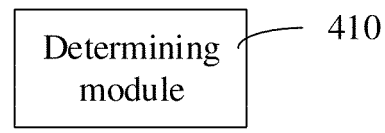
FIG. 5 is a block diagram of a device for relaxing a measurement according to a fourth embodiment of the present disclosure.

FIG. 5 is a block diagram of a device for relaxing a measurement according to a fourth embodiment of the present disclosure. As indicated in FIG. 5, the device is a terminal device, and may include but is not limited to a determining module 410.

The determining module 410 is configured to determine a measurement state of the terminal device according to an indication of the network device, the measurement state including a normal measurement and a relaxed measurement.

Optionally, the measurement state includes a measurement state of a serving cell.

Optionally, the determining module 410 is further configured to:

determine the measurement state of the terminal device according to an indication of a system information broadcast (SIB).

Optionally, the determining module 410 is configured to determine the measurement state of the terminal device according to the indication of the SIB, and is further configured to:

determine, according to the indication of the SIB, that the measurement state of the terminal device is the relaxed measurement.

The terminal device includes at least one of:

a terminal device with a specified type;
a terminal device with a positioning capability and in a stationary state;
a terminal device of which no cell reselection has occurred within a time threshold; or
a terminal device whose reference signal received power is greater than a threshold.

Optionally, the determining module 410 is further configured to determine the measurement state of the terminal device according to an indication of dedicated signaling.

The terminal device includes a terminal device in a connected state.

Optionally, the device for relaxing the measurement may include, but is not limited to a reporting module 430.

The reporting module 430 is configured to report measurement assistance information to the network device. The measurement assistance information is used by the network device to generate the dedicated signaling according to the measurement assistance information.

Optionally, the determining module 410 is configured to determine the measurement state of the terminal device according to the indication of the dedicated signaling, and is further configured to:

determine that the measurement state of the terminal device is the relaxed measurement according to the indication of the dedicated signaling in response to at least one of that: the measurement assistance information includes that the terminal device is of a specified type, or the measurement assistance information includes that the terminal device is in a stationary state or a low mobility state; and determine that the measurement state of the terminal device is the normal measurement according to the indication of the dedicated signaling in response to that the measurement assistance information includes that the terminal device leaves the stationary state or the low mobility state.

Optionally, the terminal device being in the stationary state or the low mobility state includes at least one of that: the terminal device with a positioning capability determines that the terminal device is in the stationary state, no cell reselection has occurred within a time threshold, or a number of cell reselections within the time threshold is less than a threshold; and the terminal device leaving the stationary state or the low mobility state includes at least one of that: the terminal device with the positioning capability determines that the terminal device leaves the stationary state or the low mobility state, or the number of cell reselections within the time threshold is greater than the threshold.

Optionally, the dedicated signaling includes at least one of:

radio resource control (RRC) signaling;
media access control control element (MAC CE) signaling; or
physical downlink control channel (PDCCH) signaling.

Optionally, the device for relaxing the measurement may include, but is not limited to a receiving module 450.

The receiving module 450 is configured to receive at least one of a first timer or a second timer for the network device. The first timer is a maximum duration for the relaxed measurement, and the second timer is a duration for the normal measurement.

Optionally, the device for relaxing the measurement may include, but is not limited to a switching module.

The switching module is configured to switch the measurement state of the terminal device to the relaxed measurement in response to that the measurement state of the terminal device is the normal measurement and the second timer expires; and switch the measurement state of the terminal device to the normal measurement in response to that the measurement state of the terminal device is the relaxed measurement and the first timer expires.

Optionally, the operation of relaxing the measurement includes at least one of that:

the measurement is performed at a first time interval; or, the measurement is stopped.

The implementation process of the functions and effects of each module and other parts not described or defined in detail in the embodiment are described in detail in the above Embodiment 1 and Embodiment 2, and are not described herein again.

Figure 6:
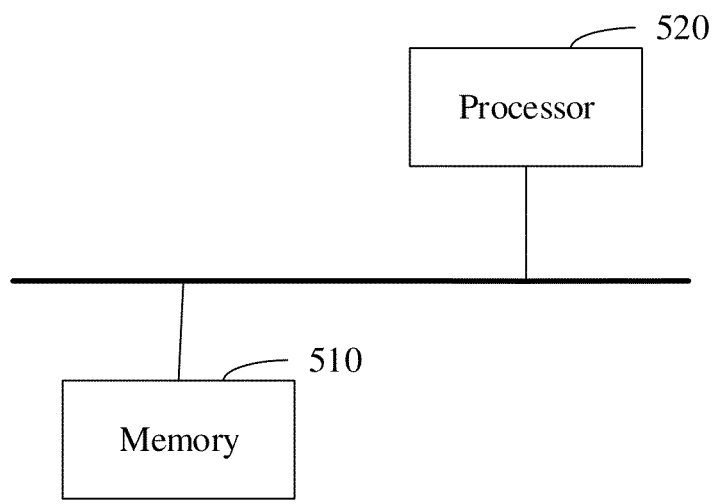
FIG. 6 is a schematic diagram of a hardware structure of a device for relaxing a measurement according to a fifth embodiment of the present disclosure.

FIG. 6 is a schematic diagram of a hardware structure of a device for relaxing a measurement according to a fifth embodiment of the present disclosure. The device includes a processor 510, a memory 520, and the above components of the device are communicatively connected to each other via a bus system.

The memory 520 is configured to store a program executable by the processor 510, and the processor 510 is configured to execute the program to implement some or all of the operations of the method for relaxing the measurement in the first embodiment.

The processor 510 may also be an independent component, or may be a collective name of multiple processing elements. For example, may be a CPU, may be an ASIC, or may be one or more integrated circuits configured to implement the above method, such as at least one microprocessor DSP, or at least one programmable gate array FPGA, or the like.

Embodiments of the present disclosure further provide a computer-readable storage medium, the computer-readable storage medium having stored thereon a computer program, herein the computer program, when being executed, implements some or all of the operations of the method for relaxing the measurement in the above-described method embodiments.

Embodiments of the present disclosure further provide a computer program product, stored on a non-transitory computer-readable storage medium, herein the computer program, when being executed, implements some or all of the operations of the method for relaxing the measurement in the above-described method embodiments. The computer program product may be a software installation package.

Embodiments of the present disclosure further provide a chip, including a processor, configured to call and execute a computer program in a memory to cause a device equipped with the chip to implement some or all of the operations of the method for relaxing the measurement in the above-described embodiment of the method.

Embodiments of the present disclosure also provide a computer program, herein the computer program, when being executed, implements some or all of the operations of the method for relaxing the measurement as in the above-described method embodiments.

The operations of the method or algorithm described in the embodiments of the present disclosure may be implemented in a hardware manner, or may be implemented by a processor executing software instructions. The software instructions may include corresponding software modules that may be stored in random access memory (RAM), flash memory, read only memory (ROM), erasable programmable ROM (EPROM), electrically EPROM (EEPROM), registers, hard disks, removable hard disks, CD read only memory (CD-ROM), or any other form of storage medium known in the art. An exemplary storage medium is coupled to the processor, thereby enabling the processor to read information from and write information to the storage medium. Of course, the storage medium may also be part of the processor. The processor and storage medium may be located in the ASIC. In addition, the ASIC may be located in an access network device, a target network device, or a core network device. Of course, the processor and storage medium may also exist as discrete components in access network devices, target network devices, or core network devices.

It should be appreciated by those skilled in the art that, in one or more of the examples described above, the functions described in particular embodiments of the present disclosure may be implemented in whole or in part by software, hardware, firmware, or any combination thereof. When implemented using software, it may be implemented in whole or in part in the form of a computer program product. The computer program product includes one or more computer instructions. When the computer program instructions are loaded and executed on a computer, all or part of the processes or functions described in accordance with embodiments of the present disclosure are generated. The computer may be a general purpose computer, a dedicated computer, a computer network, or other programmable device. The computer instructions may be stored in a computer-readable storage medium or transmitted from a computer-readable storage medium to another computer-readable storage medium. For example, the computer instructions may be transmitted from a website, computer, server, or data center to another website, computer, server, or data center by wired (e.g., coaxial cable, optical fiber, digital subscriber line (DSL)) or wireless (e.g., infrared, wireless, microwave, etc.). The computer-readable storage medium may be any available medium accessible to a computer or a data storage device such as a server, data center or the like integrated by one or more available medium. The available medium may be magnetic medium (e.g., floppy disks, hard disks, magnetic tape), optical medium (e.g., digital video disc (DVD), or semiconductor medium (e.g., solid state drive (SSD), etc.

The object, technical solutions and benefits of the above specific embodiments of the present disclosure are further described in detail. It should be understood that the above-described embodiments are merely specific embodiments of the present disclosure, and are not intended to limit the protection scope of the present disclosure. Any modification, equivalent replacement, improvement, etc. made on the basis of the technical solutions of the present disclosure should be included in the protection scope of the present disclosure.

It should be understood that the present disclosure is not limited to the precise structure already described above and indicated in the drawings, and that various modifications and changes may be performed without departing from its scope. The scope of the present disclosure is limited only by the appended claims.

What is claimed is:

1. A method for relaxing a measurement, applied to a network device, comprising:
    indicating a measurement state of a terminal device, wherein the measurement state comprises a normal measurement and a relaxed measurement for a serving cell;
    wherein the measurement state comprises a state for measuring a serving cell, which indicates the terminal device to perform a serving cell measurement;
    wherein the terminal device comprises a terminal device in a connected state, and indicating the measurement state of the terminal device comprises:
    indicating, through dedicated signaling, that the measurement state of the terminal device is the relaxed measurement in response to at least one of that: measurement assistance information comprises that the terminal device is of a specified type, or the measurement assistance information comprises that the terminal device is in a stationary state or a low mobility state; and
    indicating, through the dedicated signaling, that the measurement state of the terminal device is the normal measurement in response to that the measurement assistance information comprises that the terminal device leaves the stationary state or the low mobility state.

2. The method of claim 1,
    wherein the dedicated signaling comprises at least one of:
    radio resource control (RRC) signaling;
    media access control control element (MAC CE) signaling; or
    physical downlink control channel (PDCCH) signaling.

3. The method of claim 1, wherein that the terminal device is in the stationary state or the low mobility state comprises at least one of that: the terminal device with a positioning capability determines that the terminal device is in the stationary state, no cell reselection has occurred within a time threshold, or a number of cell reselections within the time threshold is less than a threshold; and wherein that the terminal device leaves the stationary state or the low mobility state comprises at least one of that: the terminal device with the positioning capability determines that the terminal device leaves the stationary state or the low mobility state, or the number of cell reselections within the time threshold is greater than the threshold.

4. The method of claim 1, further comprising:

configuring at least one of a first timer or a second timer for the terminal device, wherein the first timer is a maximum duration for the relaxed measurement, and the second timer is a duration for the normal measurement;

wherein the second timer is configured to switch the measurement state of the terminal device to the relaxed measurement in response to that the measurement state of the terminal device is the normal measurement and the second timer expires; and wherein the first timer is configured to switch the measurement state of the terminal device to the normal measurement in response to that the measurement state of the terminal device is the relaxed measurement and the first timer expires;

wherein relaxing the measurement comprises at least one of:

performing the measurement at a first time interval; or stopping the measurement.

5. A method for relaxing a measurement, applied to a terminal device, comprising:

determining a measurement state of the terminal device according to an indication of a network device, wherein the measurement state comprises a normal measurement and a relaxed measurement for a serving cell;

wherein the measurement state comprises a state for measuring a serving cell, which indicates the terminal device to perform a serving cell measurement;

wherein the terminal device comprises a terminal device in a connected state, determining the measurement state of the terminal device according to the indication of the network device comprises:

determining that the measurement state of the terminal device is the relaxed measurement according to an indication of dedicated signaling in response to at least one of that: measurement assistance information comprises that the terminal device is of a specified type, or the measurement assistance information comprises that the terminal device is in a stationary state or a low mobility state; and determining that the measurement state of the terminal device is the normal measurement according to the indication of the dedicated signaling in response to that the measurement assistance information comprises that the terminal device leaves the stationary state or the low mobility state.

6. The method of claim 5, wherein the dedicated signaling comprises at least one of:

radio resource control (RRC) signaling;

media access control control element (MAC CE) signaling; or physical downlink control channel (PDCCH) signaling.

7. The method of claim 5, wherein that the terminal device is in the stationary or the low mobility state comprises at least one of that: the terminal device with a positioning capability determines that the terminal device is in the stationary state, no cell reselection has occurred within a time threshold, or a number of cell reselections within the time threshold is less than a threshold; and wherein that the terminal device leaves the stationary state or the low mobility state comprises at least one of that: the terminal device with the positioning capability determines that the terminal device leaves the stationary state or the low mobility state, or the number of cell reselections within the time threshold is greater than the threshold.

8. A device for relaxing a measurement, comprising a processor and a memory, wherein the memory is configured to store a program executable by the processor, and the processor is configured to:

indicate a measurement state of a terminal device, wherein the measurement state comprises a normal measurement and a relaxed measurement for a serving cell;

wherein the measurement state comprises a state for measuring a serving cell, which indicates the terminal device to perform a serving cell measurement;

wherein the terminal device comprises a terminal device in a connected state, and the processor is configured to:

indicate, through dedicated signaling, that the measurement state of the terminal device is the relaxed measurement in response to at least one of that: measurement assistance information comprises that the terminal device is of a specified type, or the measurement assistance information comprises that the terminal device is in a stationary state or a low mobility state; and indicate, through the dedicated signaling, that the measurement state of the terminal device is the normal measurement in response to that the measurement assistance information comprises that the terminal device leaves the stationary state or the low mobility state.

9. A device for relaxing a measurement, comprising a processor and a memory, wherein the memory is configured to store a program executable by the processor, and the processor is configured to:

determine a measurement state of a terminal device according to an indication of a network device, wherein the measurement state comprises a normal measurement and a relaxed measurement for a serving cell;

wherein the measurement state comprises a state for measuring a serving cell, which indicates the terminal device to perform a serving cell measurement;

wherein the terminal device comprises a terminal device in a connected state, and the processor is configured to:

determine that the measurement state of the terminal device is the relaxed measurement according to an indication of dedicated signaling in response to at least one of that: measurement assistance information comprises that the terminal device is of a specified type, or the measurement assistance information comprises that the terminal device is in a stationary state or a low mobility state; and determine that the measurement state of the terminal device is the normal measurement according to the indication of the dedicated signaling in response to that the measurement assistance information comprises that the terminal device leaves the stationary state or the low mobility state.

10. The device of claim 9,
wherein the dedicated signaling comprises at least one of:
radio resource control (RRC) signaling;
media access control control element (MAC CE) signaling; or
physical downlink control channel (PDCCH) signaling.

11. The device of claim 9, wherein that the terminal device is in the stationary state or the low mobility state comprises at least one of that: the terminal device with a positioning capability determines that the terminal device is in the stationary state, no cell reselection has occurred within a time threshold, or a number of cell reselections within the time threshold is less than a threshold; and
wherein that the terminal device leaves the stationary state or the low mobility state comprises at least one of that: the terminal device with the positioning capability determines that the terminal device leaves the stationary state or the low mobility state, or the number of cell reselections within the time threshold is greater than the threshold.

12. The device of claim 9, wherein the processor is further configured to:
receive at least one of a first timer or a second timer for the network device, wherein the first timer is a maximum duration for the relaxed measurement, and the second timer is a duration for the normal measurement;
wherein the processor is further configured to:
switch the measurement state of the terminal device to the relaxed measurement in response to that the measurement state of the terminal device is the normal measurement and the second timer expires; and
switch the measurement state of the terminal device to the normal measurement in response to that the measurement state of the terminal device is the relaxed measurement and the first timer expires;
wherein relaxing the measurement comprises at least one of:
performing the measurement at a first time interval; or
stopping the measurement.

13. The method of claim 1, further comprising:
generating the dedicated signaling according to measurement assistance information reported by the terminal device.

14. The method of claim 5, further comprising:
reporting measurement assistance information to the network device, wherein the measurement assistance information is used by the network device to generate the dedicated signaling according to the measurement assistance information.

15. The device of claim 8, wherein the dedicated signaling comprises at least one of:
radio resource control (RRC) signaling;
media access control control element (MAC CE) signaling; or
physical downlink control channel (PDCCH) signaling.

16. The device of claim 8, wherein that the terminal device is in the stationary state or the low mobility state comprises at least one of that: the terminal device with a positioning capability determines that the terminal device is in the stationary state, no cell reselection has occurred within a time threshold, or a number of cell reselections within the time threshold is less than a threshold; and
wherein that the terminal device leaves the stationary state or the low mobility state comprises at least one of that: the terminal device with the positioning capability determines that the terminal device leaves the stationary state or the low mobility state, or the number of cell reselections within the time threshold is greater than the threshold.

17. The device of claim 8, wherein the processor is further configured to:
configure at least one of a first timer or a second timer for the terminal device, wherein the first timer is a maximum duration for the relaxed measurement, and the second timer is a duration for the normal measurement;
wherein the second timer is configured to switch the measurement state of the terminal device to the relaxed measurement in response to that the measurement state of the terminal device is the normal measurement and the second timer expires; and
wherein the first timer is configured to switch the measurement state of the terminal device to the normal measurement in response to that the measurement state of the terminal device is the relaxed measurement and the first timer expires.

18. The device of claim 8, wherein the processor is specifically configured to:
perform the measurement at a first time interval; or
stop the measurement.

19. The device of claim 8, wherein the processor is further configured to:
generate the dedicated signaling according to measurement assistance information reported by the terminal device.

20. The device of claim 9, wherein the processor is further configured to:
report measurement assistance information to the network device, wherein the measurement assistance information is used by the network device to generate the dedicated signaling according to the measurement assistance information.

\* \* \* \* \*